(12) United States Patent
Zhang

(10) Patent No.: US 6,992,907 B2
(45) Date of Patent: Jan. 31, 2006

(54) WAVE TRANSFORMATION METHOD AND DEVICE

(76) Inventor: Dongsheng Zhang, 1-6-502, Yiliyuan, Kunminghu Road, Haidian District, Beijing (CN), 100089

( * ) Notice: Subject to any disclaimer, the term of this patent is extended or adjusted under 35 U.S.C. 154(b) by 141 days.

(21) Appl. No.: 10/467,301

(22) PCT Filed: Dec. 5, 2001

(86) PCT No.: PCT/CN01/01603

§ 371 (c)(1),
(2), (4) Date: Aug. 7, 2003

(87) PCT Pub. No.: WO02/063755

PCT Pub. Date: Aug. 15, 2002

(65) Prior Publication Data

US 2004/0062065 A1 Apr. 1, 2004

(30) Foreign Application Priority Data

Feb. 8, 2001 (CN) .......................................... 1102485

(51) Int. Cl.
*H02M 5/00* (2006.01)
*H02M 5/257* (2006.01)

(52) U.S. Cl. ....................................... 363/157; 363/160
(58) Field of Classification Search ................... 363/34, 363/65, 157, 159, 163, 165
See application file for complete search history.

(56) References Cited

U.S. PATENT DOCUMENTS 5,969,966 A * 10/1999 Sawa et al. .................. 363/163
6,351,397 B1 * 2/2002 Sawa et al. .................... 363/50
6,621,721 B2 * 9/2003 York ............................ 363/65

FOREIGN PATENT DOCUMENTS

CN 1200846 A 12/1998
JP 58-22582 2/1983

* cited by examiner

*Primary Examiner*—Adolf Berhane
(74) *Attorney, Agent, or Firm*—Morgan & Finnegan, LLP (57) ABSTRACT

The present invention relates a waveform transformation method and apparatus. It uses multilevel transformation module in series, and the output voltages of power modules at all levels are superposed to get the total output voltage, whereas each power transformation module realizes AC-to-AC direct conversion. The deviation between the output' voltage and setting reference voltage at any time point is made as small as possible by selecting different transformation modules as current working circuit and selecting output voltage waveform of the each different transformation modules. The invention includes outputting n groups of electrical insulating AC and n transfonnation modules connected with AC. The wave transformation method and device of present invention eliminates the intermediate DC stage, so that the circuit is greatly simplified, the cost is reduced obviously and improve working efficiency. It makes voltage and current harmonics to be reduced and obtains higher power factor.

10 Claims, 8 Drawing Sheets

WAVE TRANSFORMATION METHOD AND DEVICE

FIELD OF INVENTION

The present invention is related to a wave transformation method and device in high voltage switch field. More particularly, this invention is related to a variable-frequency drive or variable-frequency power supply for motors.

BACKGROUND OF INVENTION

Frequency converters and variable-frequency power supplies are widely used as driving units for AC (alternating current) motors and so on, and most of them employ AC-AC conversion or AC-DC (direct current) conversion mode. The existing technology for AC-AC frequency converters utilizes direct AC-AC conversion and output Volt Alternating Current (VAC) through altering the triggering angle of a switch component. Such a solution achieves a relative low power factor and may result in heavy harmonic wave pollution to the electric network and electric devices. On the other hand, the existing technology for voltage-type AC-DC-AC general-purpose frequency converters employs pulse-width modulation (PWM) method (i.e., perform switching control of intermediate DC voltage with a semiconductor switch component) to output VAC. Such a solution increases equipment cost and decreases working efficiency of equipment due to existence of the intermediate DC stage. Above problems are more severe in high capacity frequency converters and variable-frequency power supplies.

DESCRIPTION OF INVENTION

The object of the present invention is to provide a wave transformation method and device which eliminate the intermediate DC stage in order to reduce the cost of the device and improve working efficiency, and it is still a further object of the preset invention to provide a wave transformation method and device to delivers smaller voltage harmonics and higher power factor.

The AC-AC wave transformation device in the present invention comprises n transformation modules. The input terminals of those transformation modules are connected to n groups of electrical insulating AC. Each group has m phases. The output ends of those transformation modules are connected in series to form a total voltage output. Each of those transformation modules further comprises power semiconductor switch components or power semiconductor switch component groups to form a bi-directionally controllable m-phases rectification circuit, the output polarity of which is variable.

The transformation module in the device is a full-wave bi-directionally controlled m-phases rectifying circuit whose output polarity is variable. The full-wave bi-directionally controlled m-phases rectifying circuit consists of power semiconductor switching components or power semiconductor switching component groups connected. The full-wave bi-directionally controlled m-phases rectifying circuit consists of 2×m power semiconductor switching components or power semiconductor switching component groups. Each of power semiconductor switching components or power semiconductor switching component groups is connected respectively between m input lines and two output lines.

The transformation module in the device can also be a half-wave bi-directionally controlled m-phases rectifying circuit whose output polarity is variable. The half-wave bi-directionally controlled m-phases rectifying circuit consists of power semiconductor switching components or power semiconductor switching component groups connected. The half-wave bi-directionally controlled m-phases rectifying circuit consists of m+1 power semiconductor switching components or power semiconductor switching component groups, wherein m power semiconductor switching components or power semiconductor switching component groups are connected respectively between m input lines and output lines; and one power semiconductor switching component or power semiconductor switching component group is connected respectively between the input neutral line and output line.

The transformation module in the device is a bi-directionally semi-controlled m-phases rectifying circuit whose output polarity is variable. The bi-directionally semi-controlled m-phases rectifying circuit consists of power semiconductor switching components or power semiconductor switching component groups connected. The bi-directionally semi-controlled m-phases rectifying circuit consists of 2×m power semiconductor switching components or power semiconductor switching component groups, each of which is connected respectively between m input lines and two output lines.

The power semiconductor switching components in the device are bi-directional thyristors.

The power semiconductor switching component groups in the device are either unidirectional thyristors which are positive-negative connected in parallel, or IGBTs which positive-negative are connected in series, or turn-off thyristors which are positive-negative connected in parallel, or IGCTs which are positive-negative connected in parallel, or turn-off thyristors which are positive-negative connected in series, or IGCTs which are positive-negative connected in series.

The AC-AC waveform transformation method of the present invention includes the following steps:

1} setting a sine-wave voltage to be output, and dividing the sine-wave according to time interval t0, t1, t2, t3 . . . ti, and selecting the voltage waveform during t0~t1 as the given reference voltage;

2} selecting j groups from the n groups of m phases AC power supply that are electrically insulated to each other as the present input voltage, where j≦n;

3} performing bi-directionally controllable rectification on the rest (n-j) groups m phases AC, so that its output voltage is 0, 4} for the selected j groups of m phases AC which are electrically insulated each other, selecting one voltage waveform for each group from all voltage waveforms output during t0~t1 after carrying out bi-directionally controllable rectification on j groups of m phases AC voltage so that j voltage waveforms are obtained by performing bi-directionally controllable rectification on j groups of electrical insulating m phases AC;

5} finding the sum of above-mentioned j voltage waveforms to get a total calculated output voltage;

6} comparing the calculated output voltage during t0~t1 with the above-mentioned given reference voltage; selecting m phases AC power supplies of different groups from the above-mentioned n groups of m phases AC that are electrically insulated to each other as current input voltages; among the m-phase AC power supply of each group, selecting different voltage waveforms that have gone through bi-directionally controllable rectification, so that the difference between the calculated output voltage and given reference voltage is made as low as possible at any time, and the total harmonics in the output voltage is made the smallest or some high-order harmonics is made as low as possible, or the total harmonics in the sum of current for n groups of AC power supplies is made the smallest or some high-order harmonics is made as low as possible; or the average leading or lagging power factors of each in the n inputting groups is made as large as possible;

7} determine the working status of each bi-directionally controllable rectifying circuit based on the voltage waveform corresponding to each selected m-phase AC power supply, and performing bi-directionally controllable rectification in accordance to the working status determined in above way;

8} selecting the given expected voltage waveforms during t1~t2, t2~t3, ti–1~ti as given reference voltages respectively and repeat step 2~8, and obtain the desired AC output voltages.

In above mentioned method, the n groups of m phases AC power supply that are electrically insulated to each other and is obtained by way of insulated transformation or insulated phase-shift transformation of a total AC power supply.

The wave transformation method and device of present invention eliminates the intermediate DC stage, so the circuit is greatly simplified, therefore it can reduce the cost and improve working efficiency, deliver smaller voltage and current harmonics and higher power factor.

DESCRIPTION OF THE PREFERRED EMBODIMENT

The principle of the present invention and the working process of the device will be described in detail below in connection with attached figures.

Figure 1:
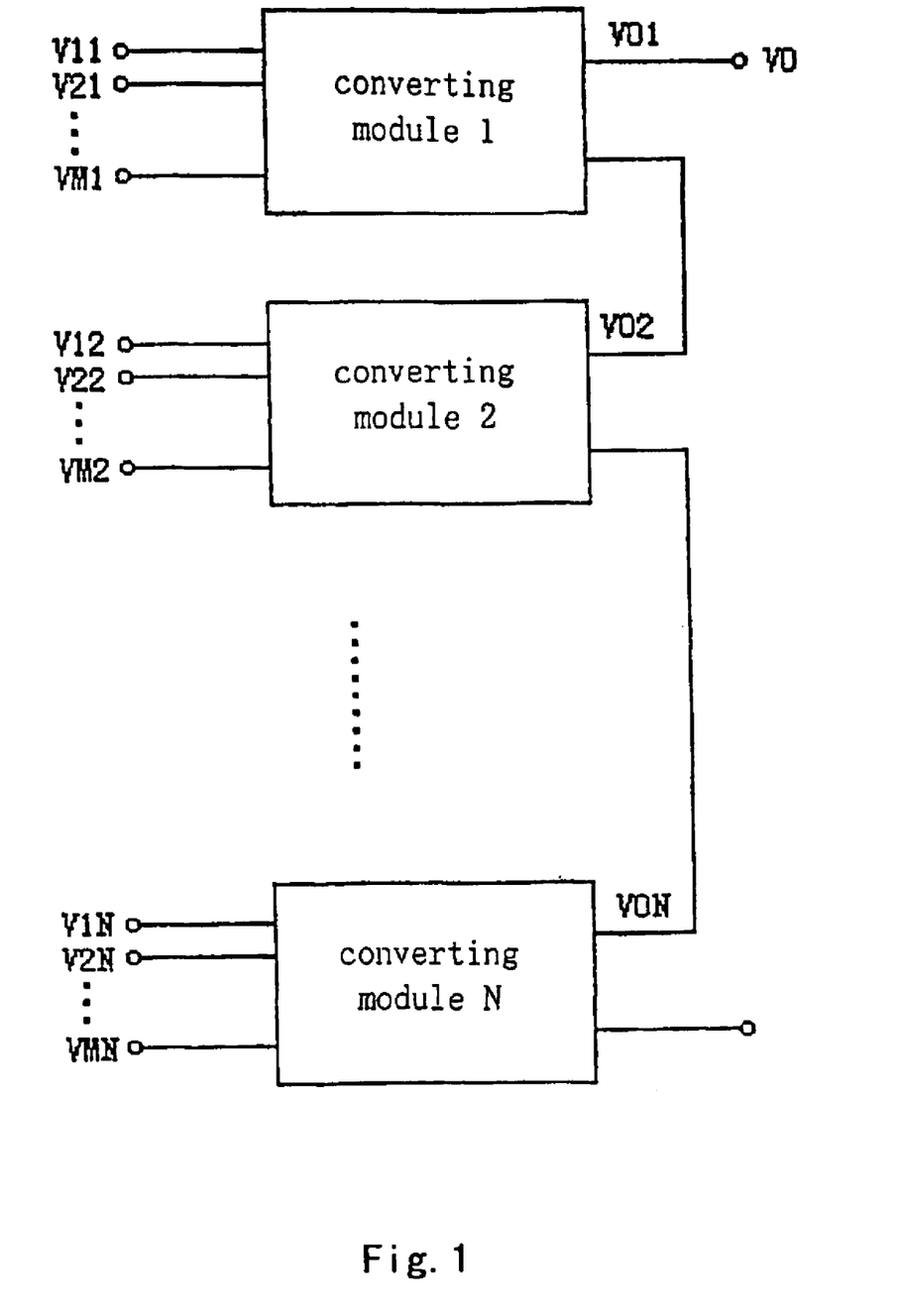
FIG. 1 is the circuit diagram of the device of present invention.

FIG. 1 is the circuit diagram of the device designed by present invention. Referring to FIG. 1, the input terminals of transformation module 1, transformation module 2 . . . transformation module N are connected respectively with input AC power supplies V11, V21, . . . VM1; V12, V22, . . . VM2; V1N, V2N, . . . VMN, and the output terminals of transformation module 1, 2 . . . M are connected in series so that a total output voltage VO is produced.

Figure 2:
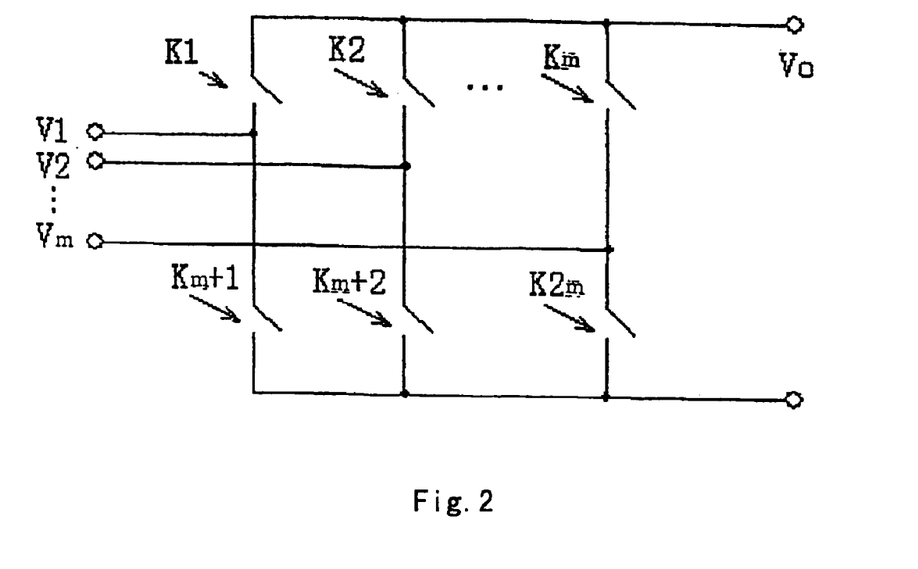
FIG. 2 is the full-wave bi-directionally controlled rectifying circuit included in the transformation module of the device of present invention.

FIG. 2 is the full-wave bi-directionally controlled rectifying circuit included in the transformation module of the device of present invention. Referring to FIG. 2, the switching component K1, K2, . . . Km, Km+1, Km+2, . . . K2m are connected to form a full-wave bi-directionally controlled m phases rectifying circuit. Each power semiconductor switching component or power semiconductor switching component group is connected respectively between m input lines and two output lines, their input terminals are connected to m-phase AC voltage V1, V2 . . . Vm, the output voltage is VO.

Figure 3:
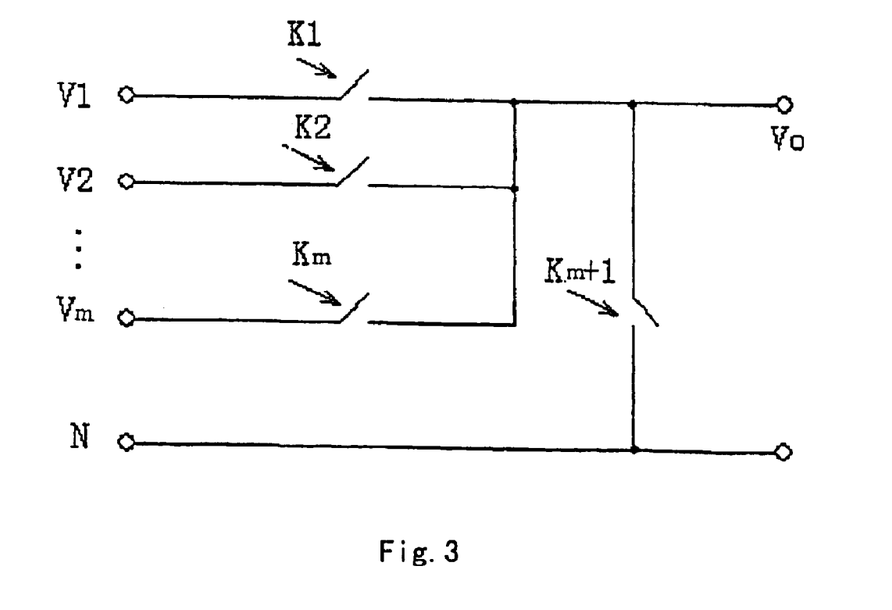
FIG. 3 is the half-wave bi-directionally controlled rectifying circuit included in the transformation module of the device of present invention.

FIG. 3 is the half-wave bi-directionally controlled rectifying circuit included in the transformation module of the device of present invention. Referring to FIG. 3, the switching component K1, K2, . . . Km, Km+1 are connected together to form a half-wave bi-directionally controlled m phases rectifying circuit, their input terminals are connected to m-phase AC voltages V1, V2, . . . Vm and neutral line N, where, m power semiconductor switching components or power semiconductor switching component groups are connected respectively between m input lines and output lines, one power semiconductor switching component or power semiconductor switching component group is connected between the inputting neutral line and output line, the output voltage is VO.

Figure 4:
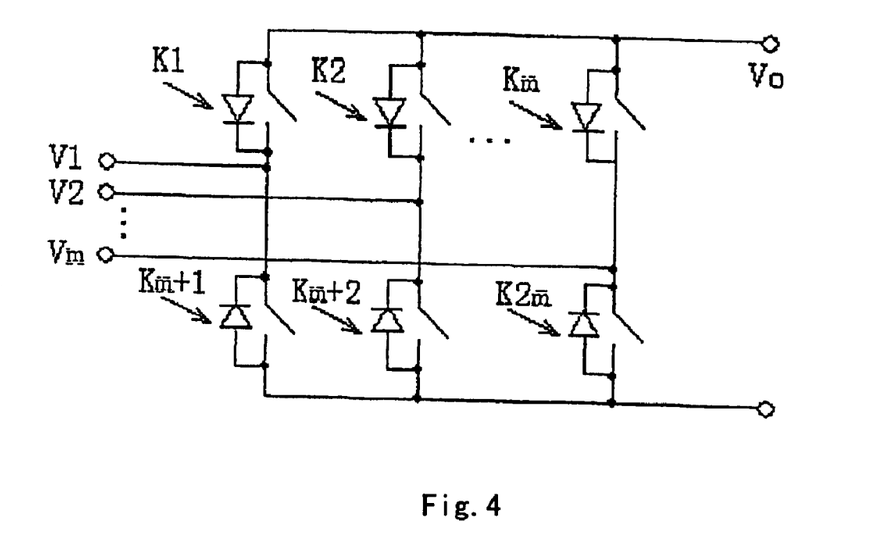
FIG. 4 is the bi-directionally semi-controlled rectifying circuit included in the transformation module of the device of present invention.

FIG. 4 is another circuit structure in the transformation module of the device of present invention. Referring to FIG. 4, each switching component includes a diode and a switch, the switching component K1, K2, . . . Km, Km+1, Km+2, . . . K2m are connected together to form a bi-directionally semi-controlled m phases rectifying circuit, each power semiconductor switching component or power semiconductor switching component group is connected respectively between m input lines and two output lines, their input terminals are connected to m-phase AC voltage V1, V2, . . . Vm, the output voltage is VO.

Figure 5:
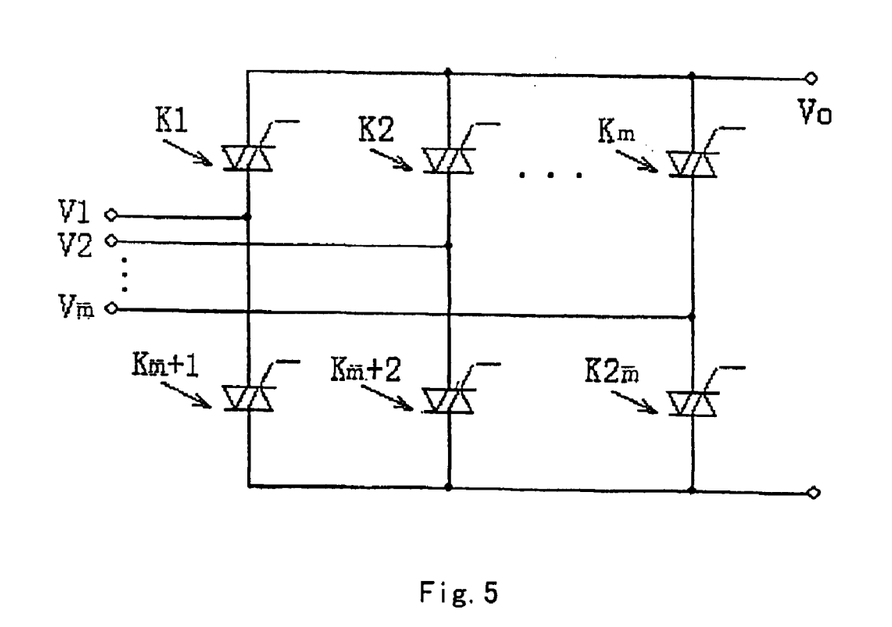
FIG. 5 is the bi-directionally controlled rectifying circuit consisting of bi-directional thyristors.

FIG. 5 is the circuit diagram of the transformation module consists of bi-directional thyristors. Referring to FIG. 5, bi-directional thyristor K1, K2, . . . Km, Km+1, Km+2, . . . K2m are connected together to form a bi-directionally controlled m phases rectifier-bridge circuit, each power semiconductor switching component is connected respectively between m input lines and two output lines, their input terminals are connected to m-phase AC voltage V1, V2, . . . Vm, the output voltage is VO.

Figure 6:
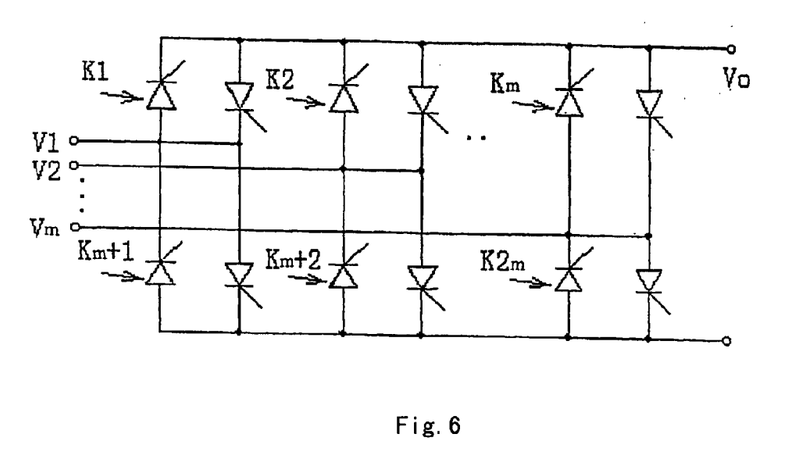
FIG. 6 is the bi-directionally controlled rectifying circuit consisting of thyristors.

FIG. 6 is the circuit diagram of the transformation module consists of unidirectional thyristors. Referring to FIG. 6, each switching component includes two thyristors connected reversely in parallel, the switching component K1, K2, . . . Km, Km+1, Km+2, . . . K2m are connected together to form a bi-directionally controlled m phases rectifying circuit, each power semiconductor switching component group is connected respectively between m input lines and two output lines, their input terminals are connected to m-phases AC voltage V1, V2, . . . Vm, the output voltage is VO.

Figure 7:
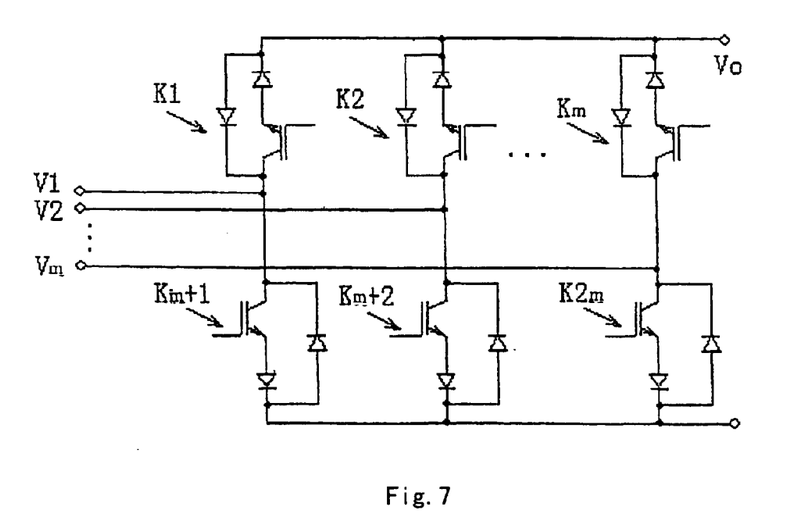
FIG. 7 is the bi-directionally semi-controlled rectifying circuit consisting of turn-off IGBTs.

FIG. 7 is the circuit diagram of transformation module consists of IGBTs. Referring to FIG. 7, each switching component group includes one IGBT and two diodes, and after the IGBT is connected to a diode in series, it is connected in series to another diode. The switching component formed in this way K1, K2, . . . Km, Km+1, Km+2, . . . K2m are connected to form a bi-directionally semi-controlled m phases rectifying circuit, each power semiconductor switching component group is connected respectively between m input lines and two output lines, their input terminals are connected to m-phases AC voltage V1, V2, . . . Vm, the output voltage is VO.

Figure 8:
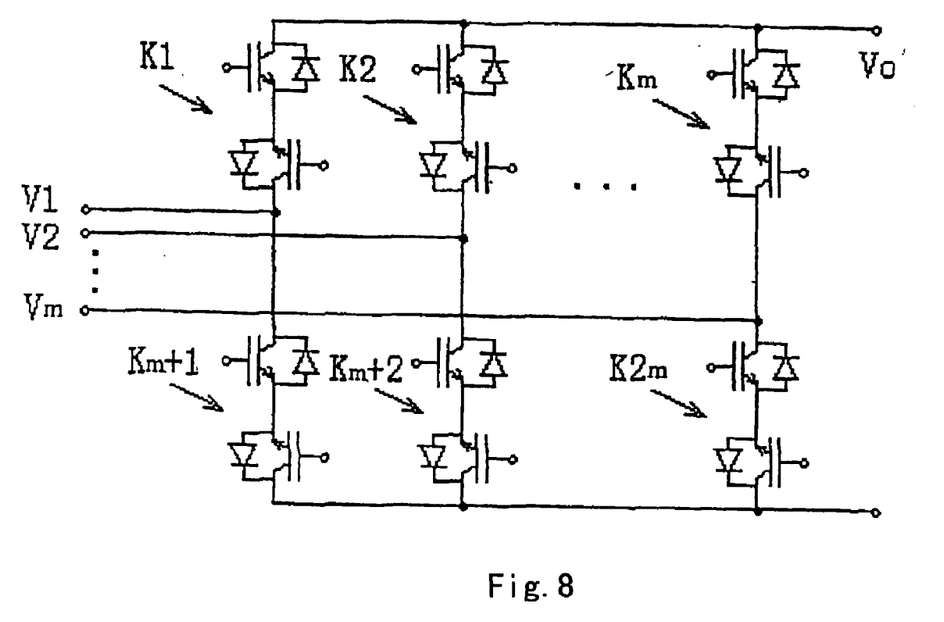
FIG. 8 is the full-wave bi-directionally controlled rectifying circuit consisting of turn-off IGBTs.

FIG. 8 is the circuit diagram of transformation module consists of IGBTs. Referring to FIG. 8, each switching component group includes two IGBTs which are connected reversely in series each other, the switching component formed in this way K1, K2, . . . Km, Km+1, Km+2, . . . K2m are connected to form a bi-directionally controlled m phases rectifying circuit, each power semiconductor switching component group is connected respectively between m input lines and two output lines, their input terminals are connected to m-phases AC voltage V1, V2, . . . Vm, the output voltage is VO.

Figure 9:
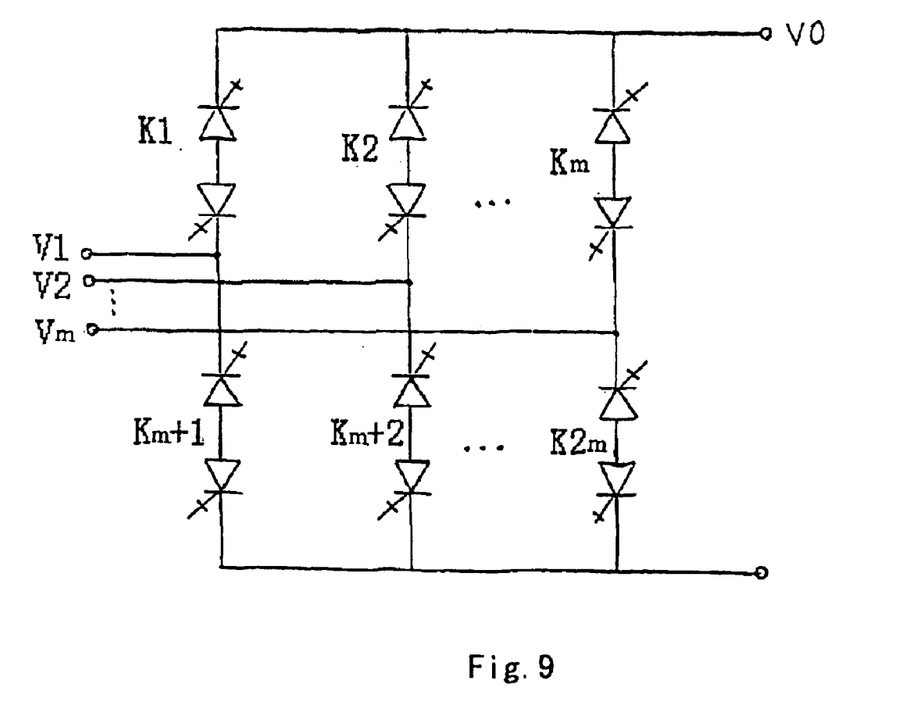
FIG. 9 is the full-wave bi-directionally controlled rectifying circuit consisting of turn-off thyristors or IGCTs in series.

FIG. 9 is the full-wave bi-directionally controlled rectifying circuit consists of turn-off thyristors or IGCTs in series. Referring to FIG. 9 each switching component includes two bi-directional thyristors or IGCTs which are connected reversely in series each other, the switching component formed in this way K1, K2, . . . Km, Km+1, Km+2, . . . K2m are connected to form a bi-directionally controlled m-phases rectifying circuit, each power semiconductor switching component group is connected respectively between m input lines and two output lines, their input terminals are connected to m-phases AC voltage V1, V2, . . . Vm, the output voltage is VO.

Figure 10:
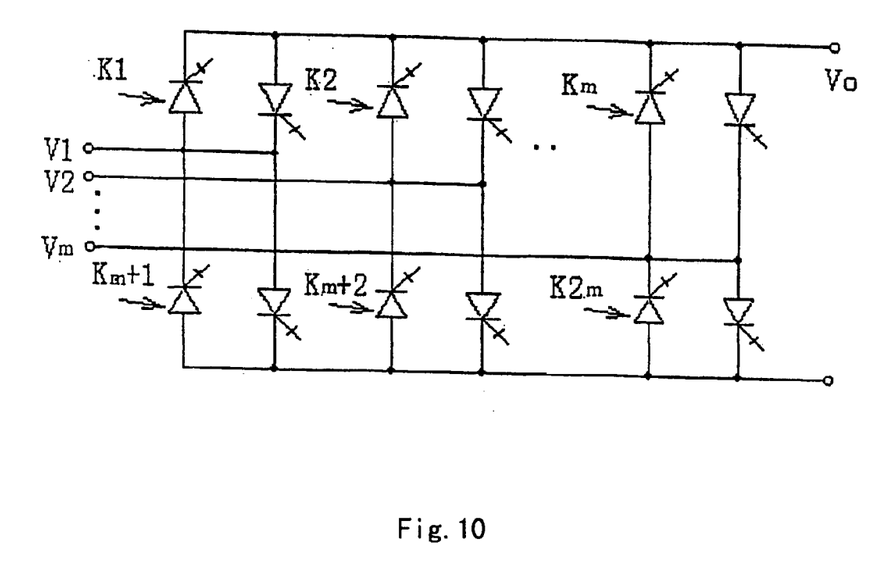
FIG. 10 is the full-wave bi-directionally controlled rectifying circuit consists of turn-off thyristors or IGCTs in parallel.

FIG. 10 is the full-wave bi-directionally controlled rectifying circuit consists of turn-off thyristors or IGCTs in parallel. Referring to FIG. 10, each switching component group includes two bi-directional thyristors or IGCTs which are connected reversely in parallel each other, the switching component formed in this way K1, K2, . . . Km, Km+1, Km+2, . . . K2m are connected to form a bi-directionally controlled m-phases rectifying circuit, each power semiconductor switching component group is connected respectively between m input lines and two output lines, their input terminals are connected to m-phases AC voltage V1, V2, . . . Vm, the output voltage is VO.

The power semiconductor switching component group in the device of present invention can also consist of one or more field effect transistors, IGCTs, IGBTs, MCTs, SITs; or consist of one or more field effect transistors, IGCTs, IGBTs, MCTs, SITs and one or more diodes.

The process of waveform transformation designed in present invention will be described in detail below. To make it clear, we take the embodiment circuit in FIG. 17 as example.

Figure 11:
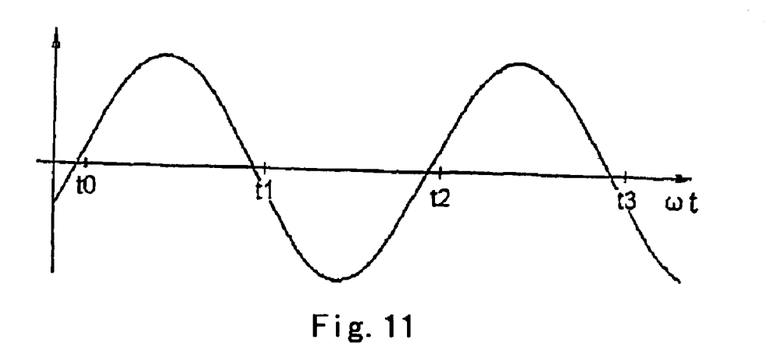
FIG. 11 is the sine-wave voltage to be output.

FIG. 11 is the waveform of expected value for given output sine-wave voltage, and it is divided into parts according to time t0, t1, t2, t3, First, the given expected voltage waveform during t0~t1 of FIG. 8 is selected as the given reference voltage.

Figure 17:
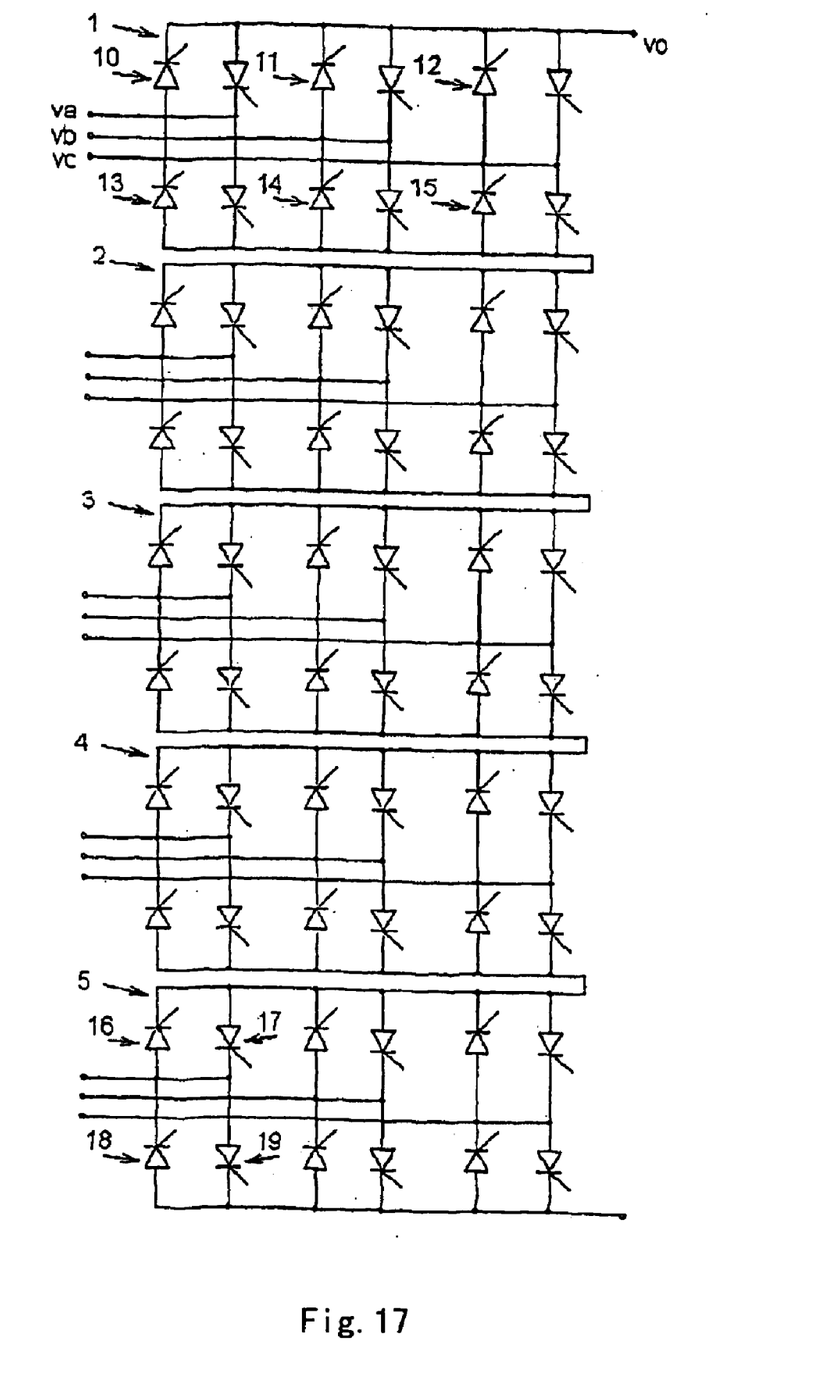
FIG. 17 is an example of the device of present invention, wherein, 1 indicates first-grade transformation module; 2 indicates second-grade transformation module; 3 indicates third-grade transformation module; 4 indicates fourth-grade transformation module; 5 indicates fifth-grade transformation module; 10–19 indicates thyristors forming the bi-directionally controlled rectifying circuit

The bi-directionally controlled rectifying circuit of transformation module 1, 2, 3 and 4 in FIG. 17 is selected as current working circuit, and turn on thyristor 16, 17, 18 and 19 in the bi-directionally controlled rectifying circuit of transformation module 5, so that bi-directionally controlled rectifying circuit 5 is under no-working state.

Next, the output voltage waveform for bi-directionally controlled rectifying circuit of each transformation module is selected as current working circuit:

For the bi-directionally controlled rectifying circuit of transformation module 1 in FIG. 17, the three-phase input voltages of the circuit respectively are assume as following:

$va = uk \sin(\omega t);$ $vb = uk \sin(\omega t - 2/3\pi);$ $vc = uk \sin(\omega t - 4/3\pi);$ wherein, uk is a constant.

Figure 12:
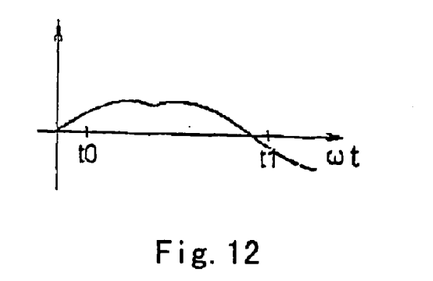
FIG. 12 is an output voltage waveform selected for bi-directionally controlled rectifying circuit.
Figure 13:
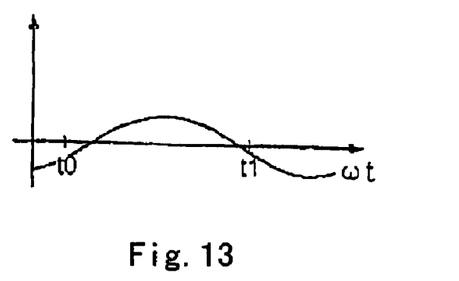
FIG. 13 is the second output voltage waveform selected.
Figure 14:
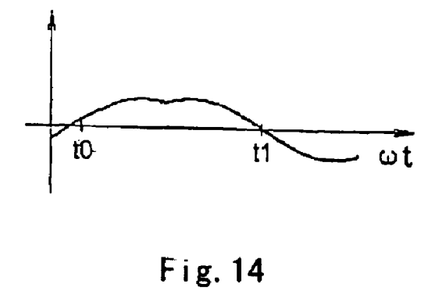
FIG. 14 is the third output voltage waveform selected.
Figure 15:
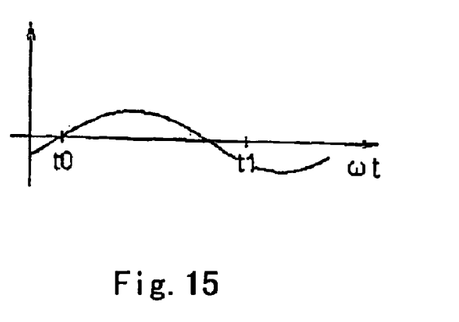
FIG. 15 is the fourth output voltage waveform selected.

For the different ON-OFF states of thyristors in the circuit, it may corresponds to various output voltage, e.g. when thyristor 10, 14 are turned on at $\omega t = t0$, its output voltage waveform at t0~t1 is (va-vb); when thyristor 11, 15 are turn on at $\omega t = t0$, its output voltage waveform at t0~t1 is (vb-vc); when thyristor 12, 13 are turn on at $\omega t = t0$, and thyristor 14 is turned on at $\omega t = 5/6\pi$, its output voltage waveform is (vc-va) (when $\omega t = t0 \sim 5/6\pi$) and (vc-vb) (when $\omega t = 5/6\pi \sim t1$). The output voltage waveform selected for transformation module 1 in this example is (va-vb) (when $\omega t = t0 \sim 2/3\pi$) and (va-vc) (when $\omega t = 2/3\pi \sim t1$) as shown in FIG. 12, and the corresponding ON-OFF state of thyristors are: thyristor 10, 14 are turned on at $\omega t = t0$, and 15 is turned on at $\omega t = 2/3\pi$. With this method, the output voltage waveform for transformation module 2 as shown in FIG. 13, that for module 3 as shown in FIG. 14, and that for module 4 as shown in FIG. 15 are selected.

Figure 16:
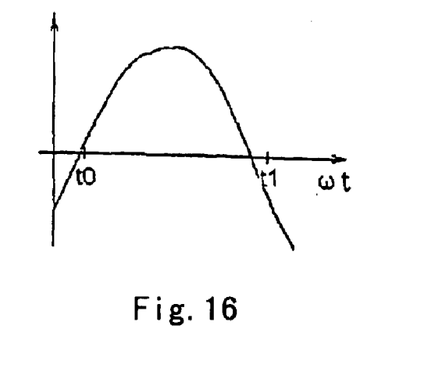
FIG. 16 is the overlapped output voltage waveform

The above selected output voltage waveforms for transformation module 1, 2, 3 and 4 are superposed to obtain the voltage waveform shown in FIG. 16. The waveform during time t0~t1 is compared with the given reference voltage during time t0~t1 (as shown in FIG. 11), the differences at different points are low, and according to Fourier transformation frequency analysis, the harmonic voltage in the output is at minimum, so it is taken as a group of an optimal output voltage waveform finally selected. If the output harmonic voltage is not minimal, it is necessary to re-select the transformation module as current working circuit or re-select the output voltage waveform of each transformation module.

Based on the optimal output voltage waveform for bi-directionally controlled rectifying circuit of each transformation module selected according to above-mentioned way, ON-OFF state of each thyristor during t0~t1 is determined, and trigger signal is sent to each thyristor, hence the desired output voltage Vo is obtained.

What is claimed is:

1. An AC-AC wave transformation device comprising:

n transformation modules;

the input terminals of each of these transformation modules are connected to n groups of m phase AC that are insulated from each other;

the output terminals of these transformation modules are connected in series to obtain a total voltage output;

wherein each transformation module includes power semiconductor switching components or power semiconductor switching component groups, the power semiconductor switching components or power semiconductor switching component groups are connected to form a full-wave bi-directionally controlled m phase rectifying circuit, the output polarity of said full-wave bi-directionally controlled m phase rectifying circuit is variable; and said full-wave bi-directionally controlled m phase rectifying circuit includes 2×m power semiconductor switching components or power semiconductor switching component groups, each of the power semiconductor switching component or power semiconductor switching component group is connected respectively between m input lines and two output lines;

the power semiconductor switching component is a bi-directional thyristor.

2. An AC-AC wave transformation device comprising:

n transformation modules;

the input terminals of each of these transformation modules are connected to n groups of m phase AC that are insulated from each other;

the output terminals of these transformation modules are connected in series to obtain a total voltage output;

wherein each transformation module includes power semiconductor switching components or power semiconductor switching component groups, the power semiconductor switching components or power semiconductor switching component groups are connected to form a full-wave bi-directionally controlled m chase rectifying circuit, the output polarity of said full-wave bi-directionally controlled m phase rectifying circuit is variable; and said full-wave bi-directionally controlled m phase rectifying circuit includes 2×m power semiconductor switching components or power semiconductor switching component groups, each of the power semiconductor switching component or power semiconductor switching component group is connected respectively between m input lines and two output lines;

the power semiconductor switching component group is unidirectional thyristors which are positive-negative connected in parallel.

3. An AC-AC wave transformation device comprising:

n transformation modules;

the input terminals of each of these transformation modules are connected to n groups of m phase AC that are insulated from each other;

the output terminals of these transformation modules are connected in series to obtain a total voltage output;

wherein each transformation module includes power semiconductor switching components or power semiconductor switching component groups, the power semiconductor switching components or power semiconductor switching component groups are connected to form a half-wave bi-directionally controlled m phase rectifying circuit, the output polarity of said half-wave bi-directionally controlled m phase rectifying circuit is variable; and said half-wave bi-directionally controlled m phase rectifying circuit includes m+1 power semiconductor switching components or power semiconductor switching component groups, each of m power semiconductor switching component or power semiconductor switching component group is connected respectively between m input lines and output lines, and one power semiconductor switching component or power semiconductor switching component group is connected between the input neutral line and output line;

the power semiconductor switching component is a bi-directional thyristor.

4. An AC-AC wave transformation device comprising:

n transformation modules;

the input terminals of each of these transformation modules are connected to n groups of m phase AC that are insulated from each other;

the output terminals of these transformation modules are connected in series to obtain a total voltage output;

wherein each transformation module includes power semiconductor switching components or power semiconductor switching component groups, the power semiconductor switching components or power semiconductor switching component groups are connected to form a half-wave bi-directionally controlled m phase rectifying circuit, the output polarity of said half-wave bi-directionally controlled m phase rectifying circuit is variable; and said half-wave bi-directionally controlled m phase rectifying circuit includes m+1 power semiconductor switching components or power semiconductor switching component groups, each of m power semiconductor switching component or power semiconductor switching component group is connected respectively between m input lines and output lines, and one power semiconductor switching component or power semiconductor switching component group is connected between the input neutral line and output line;

the power semiconductor switching component group is unidirectional thyristors which are positive-negative connected in parallel.

5. The AC-AC waveform transformation device according to claim 2, wherein the power semiconductor switching component group is turn-off thyristors or IGCTs which are positive-negative connected in parallel or turn-off thyristors or IGCTs which are positive-negative connected in series.

6. An AC-AC waveform transformation method, including the following steps:

setting a sine-wave voltage to be output, and dividing the sine-wave according to time interval t0, t1, t2, t3, . . . ti, and selecting the voltage waveform during time t0~t1 as the given reference voltage;

selecting j groups from n groups of m phases AC power supplies that are electrically insulated to each other as the current input voltage, where j≦n;

performing bi-directionally controlled current rectification on the rest n-j groups of m phases AC power supplies so that its output voltage is 0;

for the selected j groups of m phases AC power supplies that are electrically insulated to each other, selecting one voltage waveform for each group from all voltage waveforms output during t0~t1 obtained after carrying out bi-directionally controlled rectification on j groups of m phases AC voltage so that j voltage waveforms are obtained by bi-directionally controlled rectification on the j group of m phases AC voltage that are electrically insulated to each other;

finding the sum of said j voltage waveforms and get a total calculated output voltage;

comparing the calculated output voltage during t0~t1 with said given reference voltage; selecting m-phase AC power supplies of different groups from the above-mentioned n groups of m phase AC power supplies that are electrically insulated to each other as current input voltage; among each group of the m-phase AC power supplies, selecting different voltage waveforms on which gone through bi-directionally controlled rectification has been performed, so that the difference between the calculated output voltage and given reference voltage is made as low as possible at any time, and the total harmonics in the output voltage is made the smallest or some high-order harmonics is made as low as possible, or the total harmonics in the sum of current for n groups of AC power supplies is made the smallest or some high-order harmonics is made as low as possible; or the average leading or lagging power factors of each supply in the n input groups is make as large as possible;

determining the working status of each bi-directionally controlled rectifying circuit based on the voltage waveform corresponding to each selected m-phase AC power supply, and performing bi-directionally controlled rectification in accordance to the working status determined; and selecting the given expected voltage waveforms during time t1~t2, t2~t3, . . . ti−1~ti as given reference voltages respectively, repeating step 2~8, and obtain the desired AC output voltage.

7. The AC-AC waveform transformation method according to claim 6, wherein said n groups of m phases AC power supplies that are electrically insulated to each other are obtained by way of insulated transformation or insulated phase-shift transformation of a total AC power supply.

8. The AC-AC waveform transformation device according to claim 3, wherein the power semiconductor switching component group is unidirectional thyristors which are positive-negative connected in parallel or IGBTs which are positive-negative connected in series.

9. The AC-AC waveform transformation device according to one of claim 3, wherein the power semiconductor switching component group is turn-off thyristors or IGCTs which are positive-negative connected in parallel or turn-off thyristors or IGCTs which are positive-negative connected in series.

10. The AC-AC waveform transformation device according to one of claim 4, wherein the power semiconductor switching component group is turn-off thyristors or IGCTs which are positive-negative connected in parallel or turn-off thyristors or IGCTs which are positive-negative connected in series.

* * * * *